(12) United States Patent
Chafey et al.

(10) Patent No.: US 8,262,113 B1
(45) Date of Patent: Sep. 11, 2012

(54) POWERED RUNNING BOARDS FOR LOCKING DOORS OF A VEHICLE

(76) Inventors: John R. Chafey, Buckeye, AZ (US); Renae D. Chafey, Buckey, AZ (US)

( * ) Notice: Subject to any disclaimer, the term of this patent is extended or adjusted under 35 U.S.C. 154(b) by 491 days.

(21) Appl. No.: 12/566,495

(22) Filed: Sep. 24, 2009

(51) Int. Cl.
*B60R 3/00* (2006.01)
*B60R 3/02* (2006.01)

(52) U.S. Cl. ........................ 280/166; 280/163
(58) Field of Classification Search ............... 280/163, 280/166
See application file for complete search history.

(56) References Cited

U.S. PATENT DOCUMENTS

| | | | |
|---|---|---|---|
| 3,876,230 A * | 4/1975 | Phillips | 280/166 |
| 3,912,298 A * | 10/1975 | Humphrey | 280/166 |
| 4,264,084 A * | 4/1981 | Telles | 280/166 |
| 4,874,197 A * | 10/1989 | Grable | 296/162 |
| 5,137,294 A * | 8/1992 | Martin | 280/166 |
| D340,904 S | 11/1993 | Bevier | |
| 5,547,040 A * | 8/1996 | Hanser et al. | 182/88 |
| 6,135,472 A | 10/2000 | Wilson et al. | |
| 6,179,312 B1 * | 1/2001 | Paschke et al. | 280/166 |
| 6,375,207 B1 * | 4/2002 | Dean et al. | 280/166 |
| 6,926,295 B2 | 8/2005 | Berkebile et al. | |
| 6,955,370 B2 | 10/2005 | Fabiano et al. | |
| 7,017,927 B2 * | 3/2006 | Henderson et al. | 280/166 |
| 7,055,839 B2 | 6/2006 | Leitner | |
| 7,118,120 B2 | 10/2006 | Lee et al. | |
| 8,136,826 B2 * | 3/2012 | Watson | 280/166 |
| 8,146,935 B1 * | 4/2012 | Adams | 280/166 |
| 2003/0132595 A1 * | 7/2003 | Fabiano et al. | 280/166 |
| 2003/0184040 A1 * | 10/2003 | Leitner et al. | 280/166 |
| 2004/0084868 A1 * | 5/2004 | Leitner et al. | 280/166 |
| 2005/0104318 A1 * | 5/2005 | Lee et al. | 280/166 |
| 2006/0125204 A1 * | 6/2006 | Leitner et al. | 280/166 |
| 2006/0181049 A1 * | 8/2006 | Kobayashi et al. | 280/166 |
| 2008/0042396 A1 * | 2/2008 | Watson et al. | 280/166 |
| 2008/0116653 A1 * | 5/2008 | Piotrowski | 280/166 |
| 2009/0072508 A1 * | 3/2009 | Leitner et al. | 280/166 |
| 2009/0250896 A1 * | 10/2009 | Watson | 280/166 |
| 2010/0044993 A1 * | 2/2010 | Watson | 280/166 |
| 2010/0059962 A1 * | 3/2010 | Leitner et al. | 280/166 |

* cited by examiner

*Primary Examiner* — Hau Phan
*Assistant Examiner* — Jacob Meyer

(57) ABSTRACT

A powered running board for attaching to a vehicle comprising a stepping platform and a pivoting assembly. The pivoting assembly comprises a rotating bar connected to a pivoting support arm, which is attached to the stepping platform. The powered running board can pivot between a down position (e.g., horizontal orientation) and an up position (e.g., vertical orientation), wherein the down position is for providing a step for entry into and out of the vehicle, and the up position is for obstructing the opening of the side doors so as to secure the vehicle.

5 Claims, 4 Drawing Sheets

Figure 1:
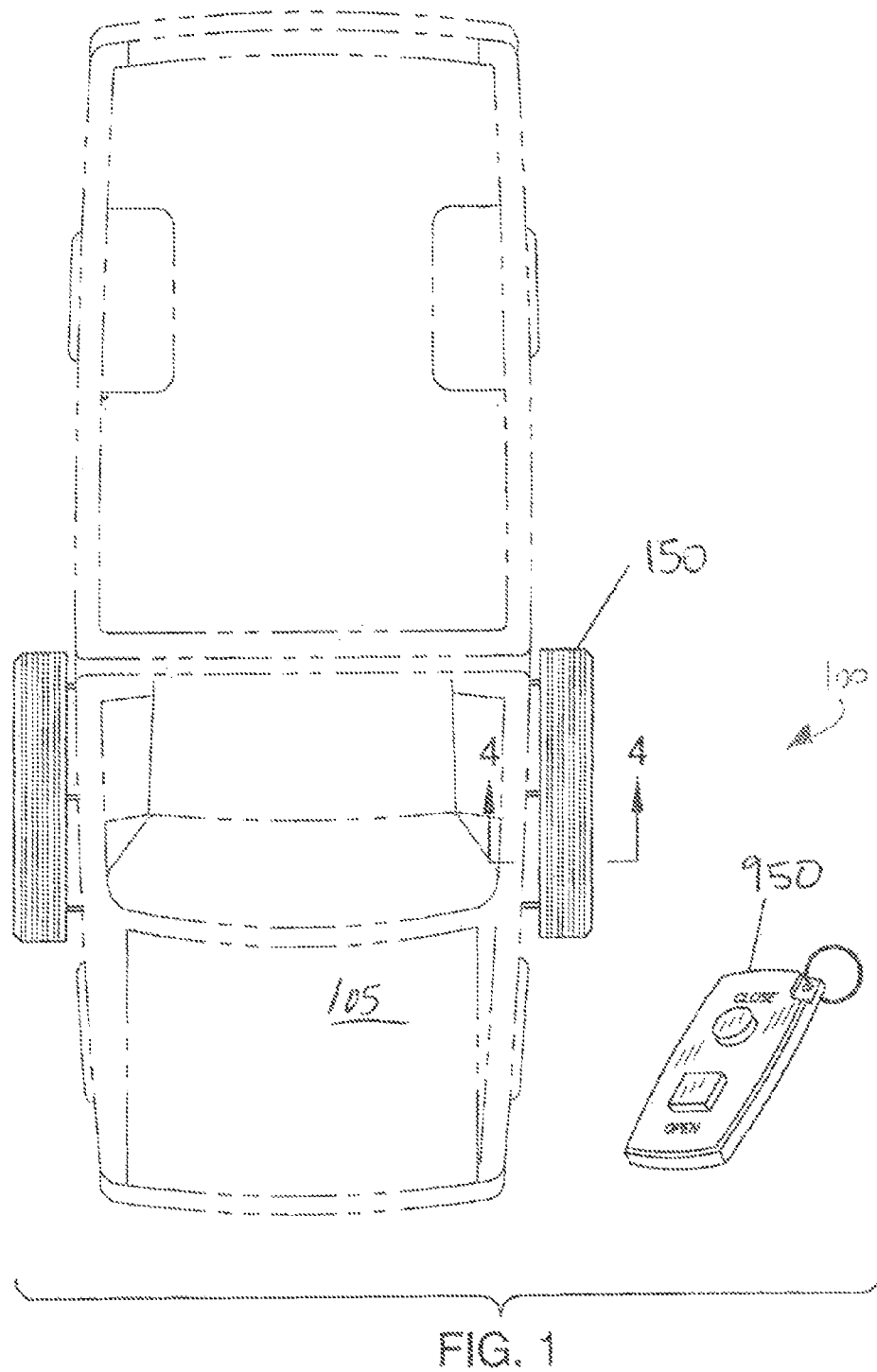
Figure 2:
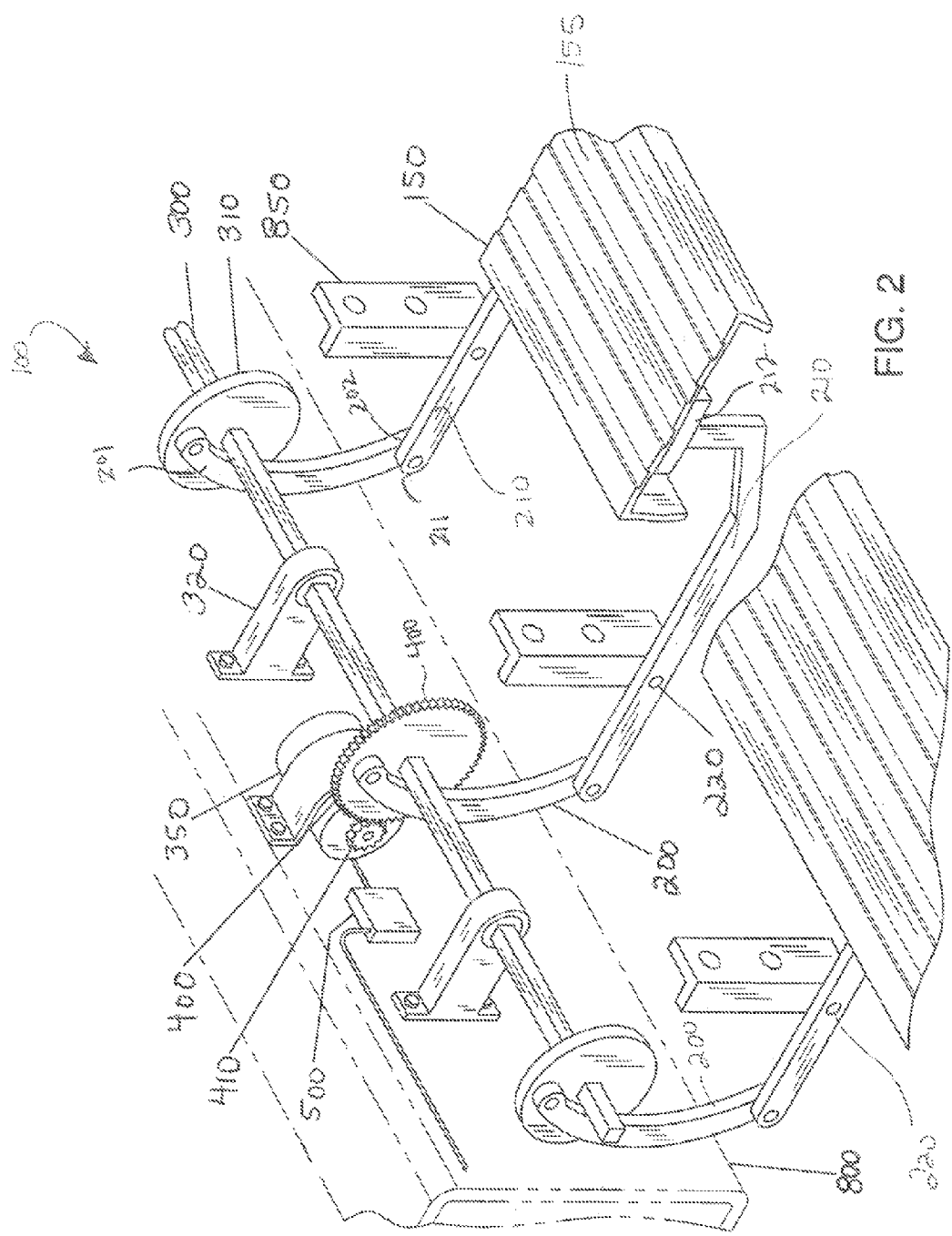
Figure 3:
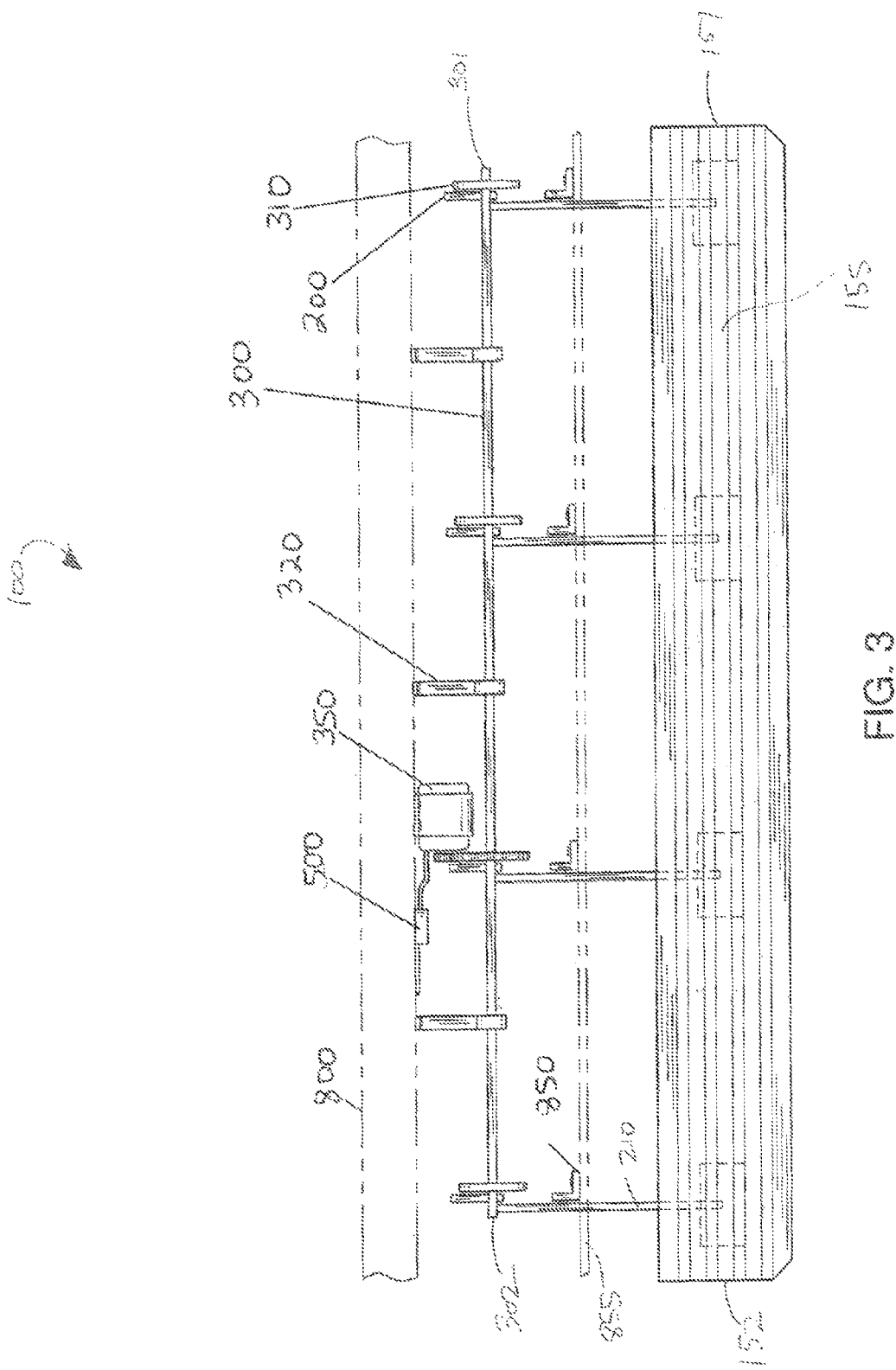
Figure 4:
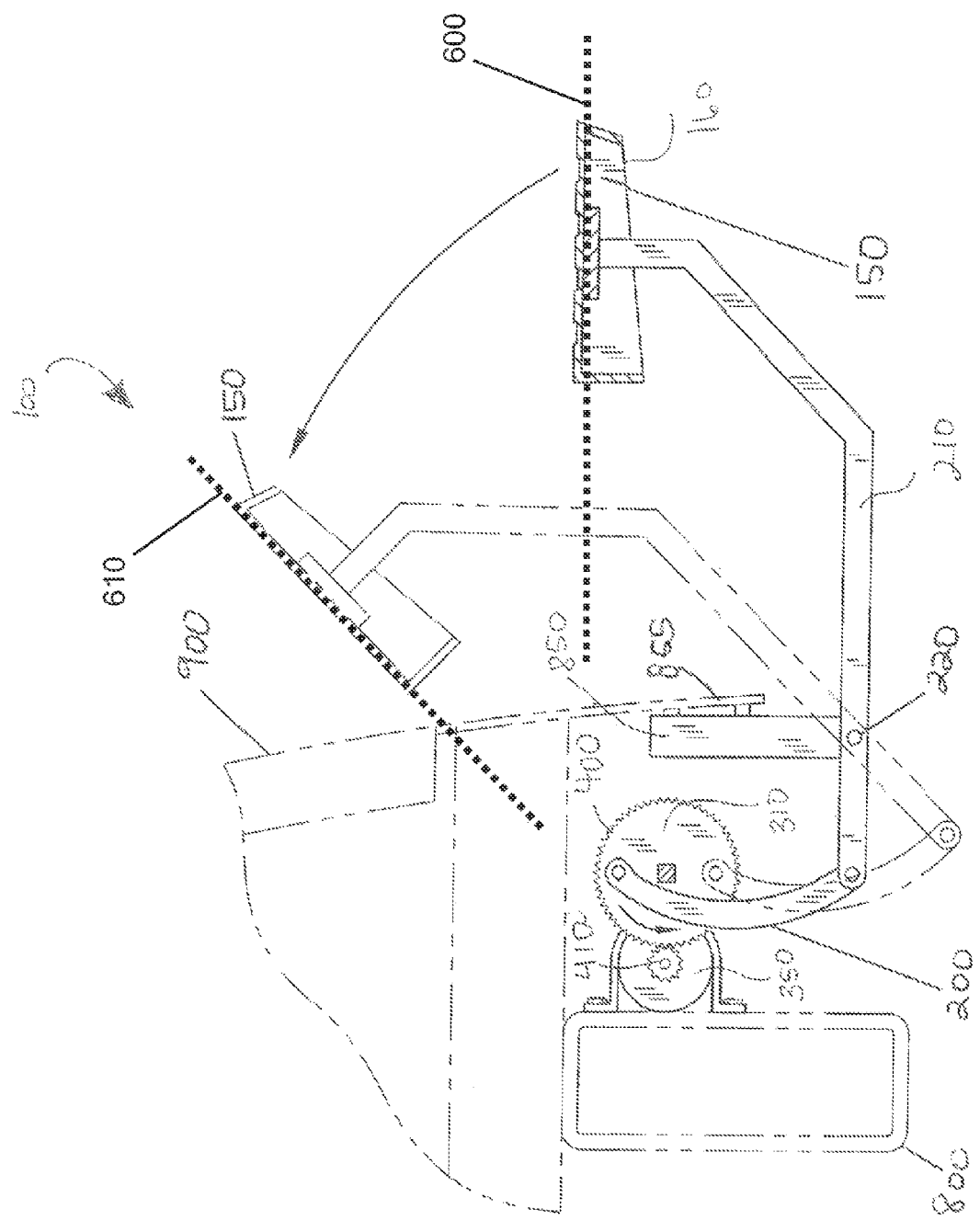

POWERED RUNNING BOARDS FOR LOCKING DOORS OF A VEHICLE

FIELD OF THE INVENTION

The present invention is directed to a motorized running boards for a vehicle. More particularly, the present invention is directed to a motorized running boards that can pivot between a down position and an up position, wherein when the running boards are in the up position, they obstruct the opening of the side doors of the vehicle for security purposes.

BACKGROUND OF THE INVENTION

Running boards are commonly found on trucks and sport utility vehicles (SUVs). Running boards provide a secure and stable step along the left and right sides of the vehicle for easy entry and exit into the vehicle. Most conventional vehicle running boards have fixed positions relative to the frames of the vehicles to which they are attached. Some running boards are motorized and can be moved from their standard position on the side of the vehicle to a position underneath the vehicle chassis when they are not in use.

The present invention features a powered running board for preventing the opening of a side door of a vehicle. The powered running board is for attaching to the chassis of a vehicle. The powered running board can pivot between a down position (e.g., horizontal orientation, the standard position of running boards) and an up position (e.g., vertical orientation). In the down position, the powered running board provides a step for entry into and out of the vehicle, similar to standard running boards. When the powered running board is in the up position, it obstructs the opening of the side doors thereby locking the doors so as to secure the vehicle. In some embodiments, a user can pivot the powered running board to the up position so as to obstruct the side doors of the vehicle when parked. The powered running board secures the vehicle and any valuables in the vehicle by preventing the side doors from being opened.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 1 is a top view of the powered running board of the present invention,

FIG. 2 is a perspective view of the powered running board of the present invention.

FIG. 3 is a top view of the powered running board of the present invention.

FIG. 4 is a side and cross sectional view of the powered running board of the present invention.

DESCRIPTION OF PREFERRED EMBODIMENTS

"Referring now to FIG. 1-4, the present invention features a powered running board 100 for attaching to the chassis 800 of a vehicle 105. The powered running board 100 can pivot between a down position on Plane A 600 (e.g., horizontal orientation), and an up position on Plane B 610 (e.g., vertical orientation), wherein the down position is for providing a step for entry into and out of the vehicle 105, and the up position is for obstructing the opening of the vehicle doors 900 so as to secure the vehicle 105. A user can pivot the powered running board 100 to the up position so as to obstruct the doors 900 of the vehicle 105 when parked. The powered running board 100 secures the vehicle 105 and any valuables in the vehicle 105 by preventing the side doors 900 from being opened."

The powered running board 100 comprises a stepping platform 150 resembling a standard running board found on vehicles. The stepping platform 150 has a top surface 155, a bottom surface 160, a first end 151, and a second end 152. The powered running board 100 further comprises a pivoting assembly for attaching to the chassis 800 of the vehicle 105.

The pivoting assembly comprises a rotating bar 300 having a first end 301, a second end 302, and a middle. The rotating bar 300 is attached to the chassis 800 of a vehicle via one or more rotating bar brackets 320. The rotating bar brackets 320 affix the rotating bar 300 to the chassis 800 while allowing the rotating bar 300 to rotate about the axis of the length of the bar (e.g., the axis derived from the first end 301 to the second end 302).

In some embodiments, a first pivot plate 310 is attached to the rotating bar 300 near the first end 301; a second pivot plate 310 is attached to the rotating bar 300 near the second end 302, and a third pivot plate 310 is attached to the rotating bar 300 in the middle. The third pivot plate 310 in the middle of the rotating bar 300 has teeth 400 disposed along its outer perimeter. The teeth 400 are for engaging a gear 410 of an electric motor 350.

An electric motor 350 is attached to the chassis 800 of the vehicle 105. The electric motor 350 has a first end and a second end. Disposed at the first end is a gear 410, which is for engaging the teeth 400 of the third pivot plate 310 attached to the middle of the rotating bar 300. When the electric motor 350 is activated, it rotates the gear 410, which in turn rotates the third pivot plate 310 in the middle of the rotating bar 300. This causes the rotating bar 300 to rotate about the axis of its length.

A pivoting support arm connects the pivot plates 310 and the stepping platform 150. The pivoting support arm comprises a linkage component 200 having a first end 201 and a second end 202, and a pivot component 210 having a first end 211, a second end 212, and a middle. The first end 201 of the linkage component 200 is pivotally attached to the pivot plate 310 via a pivot bolt 220. The second end 202 of the linkage component 200 is pivotally attached to the first end 211 of the pivot component 210. The second end 212 of the pivot component 210 is attached to the bottom surface 160 of the stepping platform 150. The middle of the pivot component 210 is pivotally attached to a vehicle attachment bracket 850 via a pivot bolt 220, wherein the vehicle attachment bracket 850 is for attaching the pivoting support arm to the bottom 855 of the vehicle body and/or the chassis 800. In some embodiments, a pivoting support arm is disposed near the first end 301 of the rotating bar 300, the second end 302 of the rotating bar 300, and/or in the middle of the rotating bar 300.

When the rotating bar 300 turns in a first direction (e.g., clockwise) about the axis of its length, the linkage component 200 is forced downward. As the linkage component 200 moves downward, the first end 211 of the pivot component 210 moves downward while the second end 212 of the pivot component 210, which is, attached to the stepping platform 150, is forced upward. This causes the stepping platform 150 to move to the up position (e.g., vertical orientation).

When the rotating bar 300 turns in a second direction (e.g., counterclockwise) about the axis of its length, the linkage component 200 is forced upward, which moves the first end 211 of the pivot component 210 upward and the second end 212 of the pivot component 210 downward. This causes the stepping platform 150 to move to the down position (e.g., horizontal orientation).

In some embodiments, the electric motor 350 is powered via the 12-volt direct current (DC) electrical system of the vehicle 105.

In some embodiments, a receiver component 500 is operatively/electrically connected to the electric motor 350. The receiver component 500 is for receiving a signal from a transmitter disposed in a remote control 950. When the receiver component 500 receives a signal from the transmitter, the electric motor 350 is activated and can cause the stepping platform 150 to be moved to the up position or the down position.

In some embodiments, a user can moves the powered running board 100 to the down position while driving. In some embodiments, the user can move the powered running board 100 to the up position while the vehicle 105 is parked. In some embodiments, the user can use the remote control 950 to activate the powered running board 100.

The powered running board 100 of the present invention may be constructed from a variety of materials. For example, in some embodiments, the powered running board 100 is constructed from a material comprising a metal (e.g., aluminum, steel), plastic, the like or a combination thereof.

The powered running board 100 of the present invention may be used on many different types of vehicles. For example, in some embodiments, the powered running board 100 is used on a truck, a sport utility vehicle (SUV), a van, and/or the like. In some embodiments, the powered running board 100 is incorporated into pre-market vehicles. In some embodiments, the powered running board 100 is attached to after-market vehicles.

The following the disclosures of the following U.S. patents are incorporated in their entirety by reference herein: U.S. Pat. No. 6,955,370 B2; U.S. Pat. No. 7,287,771 B2; U.S. Pat. No. 6,926,295 B2; U.S. Pat. No. 6,135,472; U.S. Pat. No. 7,118,120 B2; U.S. Pat. No. 7,055,839 B2; U.S. Pat. No. 7,017,927.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A powered running board for preventing a door of a vehicle from being opened, said powered running board comprising:

(a) a stepping platform having a top surface, a bottom surface, a first end, and a second end;
   (b) a rotating bar having a first end, a second end, and a middle;
   (c) a rotating bar bracket for attaching the rotating bar to the vehicle attached to a chassis of the vehicle, wherein the rotating bar bracket allows the rotating bar to rotate about an axis of its length;
   (d) a first pivot plate attached to the rotating bar near the first end, and a second pivot plate attached to the rotating bar near the second end;
   (e) a third pivot plate attached to the middle of the rotating bar; wherein the third pivot plate has an outer perimeter; wherein teeth are disposed along the outer perimeter of the third pivot plate;
   (f) a gear for engaging the teeth on the third pivot plate;
   (g) an electric motor operatively connected to the gear; wherein when the electric motor rotates the gear such that the third pivot plate rotates, causing the rotating bar to rotate; and
   (h) a pivoting support arm having a linkage component and a pivot component for pivotally connecting the first pivot plate to the stepping platform;

wherein when the rotating bar is rotated in a first direction, the pivoting support arm causes the stepping platform to move to an up position on a plane, Plane B; wherein when the rotating bar is rotated in a second direction, the pivoting support arm causes the stepping platform to move to a down position on a plane, Plane A;

wherein in the down position on Plane A, the top surface of the stepping platform has a generally horizontal orientation, wherein Plane A is oriented at an angle with respect to Plane B;

wherein the pivot component comprises a length such that in the up position on Plane B, the stepping platform is disposed so as to obstruct a door of the vehicle, wherein the top surface of the stepping platform faces the side door of the vehicle, whereby in the up position on Plane B, the stepping platform secures the vehicle and any valuables in the vehicle by preventing the side door from being opened.

2. The powered running board of claim 1, wherein the pivoting support arm comprises a linkage component having a first end and a second end and a pivot component having a first end, a second end, and a middle.

3. The powered running board of claim 1, wherein the powered running board further comprises a transmitter disposed in a remote control.

4. The powered running board of claim 3, wherein the powered running board further comprises a receiver component operatively connected to the electric motor, wherein the receiver component is for receiving a signal from the transmitter disposed in the remote control; wherein the signal allows the stepping platform to move to the up position or the down position.

5. The powered running board of claim 1, wherein the electric motor is powered via a 12-volt direct current electrical system of the vehicle.

* * * * *